United States Patent
Bloch et al.

(10) Patent No.: US 10,298,760 B2
(45) Date of Patent: May 21, 2019

(54) TELEPHONE MARKETING AND MESSAGE SYSTEM AND METHOD

(71) Applicant: DME PARTNERS, LLC, Daytona Beach, FL (US)

(72) Inventors: Bryan S. Bloch, Port Orange, FL (US); Michael J. Panaggio, Port Orange, FL (US)

(73) Assignee: SMARTCONTACT, LLC, Port Orange, FL (US)

(*) Notice: Subject to any disclaimer, the term of this patent is extended or adjusted under 35 U.S.C. 154(b) by 218 days.

(21) Appl. No.: 14/974,394

(22) Filed: Dec. 18, 2015

(65) Prior Publication Data

US 2017/0070613 A1 Mar. 9, 2017

Related U.S. Application Data

(60) Provisional application No. 62/214,554, filed on Sep. 4, 2015.

(51) Int. Cl.
| | | |
|---|---|---|
| *H04M 11/00* | (2006.01) | |
| *H04M 3/51* | (2006.01) | |
| *H04M 3/533* | (2006.01) | |
| *G06Q 10/10* | (2012.01) | |
| *H04M 3/56* | (2006.01) | |

(52) U.S. Cl.
CPC ........ *H04M 3/5191* (2013.01); *G06Q 10/107* (2013.01); *G06Q 10/1095* (2013.01); *H04M 3/53383* (2013.01); *H04M 3/565* (2013.01)

(58) Field of Classification Search
CPC .................. H04M 3/2236; H04M 3/5191
See application file for complete search history.

(56) References Cited

U.S. PATENT DOCUMENTS

| | | | | |
|---|---|---|---|---|
| 5,164,983 | A | 11/1992 | Brown et al. | |
| 6,950,502 | B1 * | 9/2005 | Jenkins | ............... H04M 3/533 379/88.12 |
| 7,280,651 | B2 | 10/2007 | Anderson | |
| 7,613,283 | B1 * | 11/2009 | Gilboy | ............... G06Q 20/401 379/114.2 |
| 7,657,022 | B2 * | 2/2010 | Anderson | ........... H04M 3/5158 379/266.07 |
| 7,937,274 | B1 | 5/2011 | Reese | |
| 8,045,699 | B2 | 10/2011 | Anderson | |
| 8,189,762 | B2 * | 5/2012 | Yacoub | ............... H04M 3/5158 379/266.07 |
| 8,879,698 | B1 * | 11/2014 | Lavian | ................. H04M 1/64 379/88.18 |

(Continued)

*Primary Examiner* — Joseph T Phan
(74) *Attorney, Agent, or Firm* — Matthew G. McKinney, Esq.; Allen, Dyer et al.

(57) ABSTRACT

A telephone marketing and messaging method includes dialing a telephone number associated with a prospect to establish a connection, and providing a conditional and automatically selected pre-recorded voicemail message of a series of voicemail messages to the prospect each time in response to arriving at a voicemail of the prospect, where each voicemail message of the series of voicemail messages is different. The voicemail messages continue to be delivered to the prospect until the prospect answers or responds. In addition, the method includes providing an email message to the prospect that correlates to a respective voicemail message delivered to the prospect.

20 Claims, 4 Drawing Sheets

(56) References Cited

U.S. PATENT DOCUMENTS

| | | | |
|---|---|---|---|
| 9,001,819 B1* | 4/2015 | Or-Bach | H04L 65/4015 370/352 |
| 2006/0262909 A9* | 11/2006 | Adamczyk | H04M 3/533 379/88.13 |
| 2007/0162542 A1 | 7/2007 | Lawrence et al. | |
| 2008/0037734 A1* | 2/2008 | Klassen | H04M 3/53333 379/88.22 |
| 2010/0158217 A1* | 6/2010 | Dhawan | H04M 3/5158 379/88.18 |
| 2011/0143723 A1* | 6/2011 | Shaw | H04L 51/14 455/413 |
| 2011/0177796 A1* | 7/2011 | Jacobstein | H04M 3/53383 455/413 |
| 2017/0094059 A1* | 3/2017 | Jacobstein | H04M 3/53391 |

\* cited by examiner

TELEPHONE MARKETING AND MESSAGE SYSTEM AND METHOD

FIELD OF THE INVENTION

The present invention relates to the field of communications, and, more particularly, to a telephone marketing and message system and method.

BACKGROUND OF THE INVENTION

There are many variations of telemarketing campaigns. One common type is where a telemarketer will be provided with a list of telephone numbers for prospects and a script. A dialer system will dial a telephone number for a prospect on the list and if the prospect answers, then the system will transfer the call to the telemarketer. The telemarketer will then read the script to the prospect on behalf of the client. If the prospect does not answer the call, then a pre-recorded voicemail message can be left. A shortcoming of this type of system is that a prospect will most likely not respond to single voicemail message.

To address this shortcoming, some campaigns may include multiple voicemail messages to the prospect. However, a shortcoming of this type of campaign is the difficulty in tracking the campaign and which voicemail messages have been left and when. In addition, if a prospect does respond to the voicemail message, the telemarketer may not be aware of which voicemail message the prospect is responding. Further, the wrong message could be delivered to a prospect or the system may continue to deliver messages after the prospect has already responded.

Accordingly, there is a need for a telephone marketing and message system that can automatically track and continue a campaign until the prospect responds or until the campaign is terminated.

SUMMARY OF THE INVENTION

In view of the foregoing background, it is therefore an object of the present invention to provide a telephone marketing and messaging method that allows a client, or a party that the client may designate, to increase business lead generation and productivity.

This and other objects, features, and advantages in accordance with the present invention are provided by the method that includes initiating a marketing campaign, and dialing a telephone number associated with a prospect a first time, wherein the telephone number is assigned to an electronic device of the prospect. The method also includes establishing a first connection with the electronic device, providing a first voicemail message in response to arriving at a voicemail of the prospect, transmitting a first email message to an email address associated with the prospect, and updating the database to indicate whether the first voicemail message was delivered to the voicemail of the prospect and the first email message was transmitted to the email address of the prospect. In addition, the method includes dialing the telephone number of the prospect a second time, establishing a second connection with the prospect, and providing a second voicemail message in response to arriving at the voicemail of the prospect, wherein the second voicemail message may be different than the first voicemail message. The method also includes transmitting a second email message to an email address associated with the prospect, updating the database to indicate the second voicemail message was delivered to the voicemail of the prospect, and terminating the marketing campaign when the prospect responds. It is important to note that the number of voicemail and email messages that can be delivered to a prospect is unlimited and is decided upon by the client and or user.

Another aspect is directed to a telephone marketing and messaging method that includes initiating a marketing campaign, dialing a telephone number associated with a prospect to establish a connection, providing one of a plurality of pre-recorded voicemail messages to the prospect each time in response to arriving at a voicemail of the prospect, wherein each voicemail message of the plurality of voicemail messages is different from one another, and continuing to provide voicemail messages to the prospect each time in response to arriving at a voicemail of the prospect until the prospect responds. In addition, the method includes updating a database each time a respective voicemail message is delivered to the prospect, and displaying a status of the marketing campaign, wherein the status includes at least a number of voicemail messages that have been delivered to the prospect. The method also includes transmitting one of a plurality of email messages, wherein a respective email message correlates with a content of a respective voicemail message delivered to the prospect, and providing the respective email message to the prospect in accordance with a pre-determined schedule. When a prospect answers the phone (as opposed to when the call goes to a voicemail), the method also includes communicating with the prospect to set an appointment with the prospect for a teleconference with a client or an attempt to make a sale with the prospect or following up on an inquiry made by the prospect or following up on the prospect's visit to a tradeshow or any such type event, or any other reason that the client may have for communicating or marketing to a prospect, storing the plurality of voicemail messages and email messages in a system database or storage device that is accessible with a graphical user interface (GUI), and generating a report that includes at least one of, a name of the prospect that was contacted, an identity of each voicemail message that was delivered to the prospect, an identity of each email message that was provided to the prospect, and a link to each of the voicemail and email messages that were provided to the prospect. Further, the method includes transmitting the report to the representative and/or directly or indirectly importing all reporting information into the client's CRM system. This reporting may also include details of appointments that are set during calls where the prospect answers the phone.

Clients can upload their own prospect list—which would include at least phone numbers and in addition, email addresses for those prospects if the client elects to take advantage of the system's ability to also deliver emails. In addition to being able to upload their own list, clients will also be able to purchase a list of businesses which would include at least the company names, the prospect names and the prospect phone numbers. There will be other data available including email addresses for most prospects. Clients can purchase this additional information. It's important to note that the system does not require the phone number to be a Direct Inward Dialing (DID) number (commonly referred to as someone's direct line) because the system has an onscreen telephone keypad or other such method that allows the agent to navigate through the prospect's phone system so that the call can be routed to the proper extension.

A system aspect is directed to a server, a database stored on the server, a plurality of telephone numbers in the database, where each telephone number is assigned to an electronic device of a prospect, and a first connection between the server and the electronic device. A first voicemail message is stored in the database to provide in response to arriving at a voicemail of the prospect, and a first email message is stored in the database to transmit to an email address associated with the prospect. The system also includes that the database is configured to be updated to indicate whether the first voicemail message was delivered to the voicemail of the prospect and the first email message was transmitted to the email address of the prospect. A conditional second connection between the server and the electronic device is established a pre-determined time subsequent to the first connection, and a second voicemail message is stored in the database to provide in response to arriving at the voicemail of the prospect, where the second voicemail message is different than the first voicemail message. In addition, the system also includes a first email message stored in the database to transmit to an email address associated with the prospect, where the database is further configured to indicate the second voicemail message was delivered to the voicemail of the prospect. The "pre-determined" time interval between voicemail and email message delivery is determined and set by the client and or user. In addition, the client also determines and sets the delay between when a voicemail message is left and when the supporting email is sent out.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
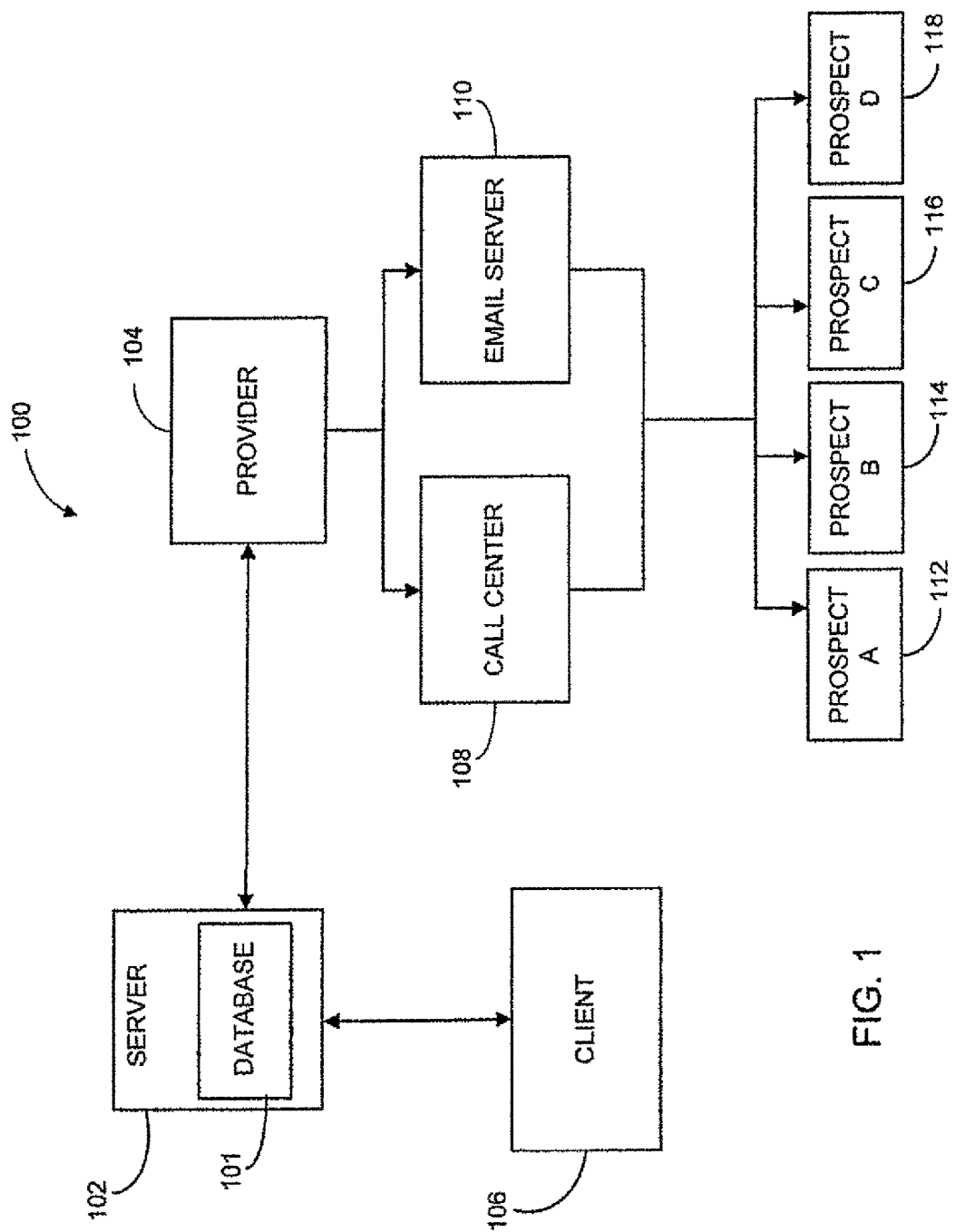
FIG. 1 is a schematic block diagram illustrating an embodiment of a telephone marketing and messaging system in accordance with features of the present invention.

A particular embodiment of a telephone marketing and messaging System 100 is disclosed and illustrated in FIG. 1. System 100 is a business to business lead generation and productivity enhancement tool. System 100 allows a person or business to leave a series of pre-recorded voicemail messages to business prospects to drive inbound responses. In addition, the series of pre-recorded voicemail messages may be combined with a series of correlating email messages. Each voicemail and email message left is conditional and automatically selected based upon the previously left voicemail message and/or email (emails are not required—they are elected by the client). The voicemail and email messages are part of a marketing campaign of multiple messages that build upon each other and continue until the prospect responds or until the marketing campaign is terminated for whatever reason. The voicemail messages may be made by the provider (as explained below) over the phone or through voicemail administration systems or the client can create their own recording(s) using a graphical user interface that incorporates a microphone and speakers or a headset with an incorporated microphone.

An object of System 100 is to make the voicemail messages more effective since one goal is to receive callbacks from voicemail messages that are delivered. To that end, System 100 may also include tips and suggestions in the form of text and/or digital video on the user interface. System 100 may also include the feature of a campaign of email messages that are designed to work with and complement the voicemail messages. Another aspect of System 100 that is unique is the fact that the calls from System 100 will appear on a caller-identification device as the caller-identification/number of the client that is using the system directly (subscription or CRM plugin). Likewise, the desired caller identification (e.g., the client's) will appear when the provider makes the calls for the client as a service, unless the client selects the "At Desk Notification" (described below) for calls that are answered live by a prospect. Emails that the provider sends as part of the campaign may be sent using the client's email address and corresponding SMTP information.

System 100 may dial the telephone numbers so that the agent can sit back and relax. The agent is defined, in a particular embodiment, as anyone using the system to make calls (either a client or an employee of the provider). The system may also display on a computer screen which messages have already been left (#1, #2, etc.). The screen may also provide contact information and an audio description for each message, and the messages already delivered as well as the next message in the campaign can be played and listened to by the client or the client's designate. System 100 may also play a "whisper" message in the ear of the person (e.g., agent) making the calls to report how many messages, if any, have been left to the prospect before the call is dialed by System 100. The name of the prospect may even be reported during this whisper. This is in addition to the information on the screen which may include the same information.

When making the calls, agents may see the following on their screen: the number of messages already left; a short audio description of each message; and the local time for the agent and the time for the prospect (based upon the area code) which is useful since part or even the majority of the list may be in another time zone. In addition, agents may have the following whispered in their ear right before each record is dialed: "X messages have been left for this contact"—"the contact name is X."

The agent may set an appointment with the prospect if the electronic device (e.g., telephone) is answered live by the prospect. In addition, the agent may attempt to make a sale with the prospect or follow up on an inquiry made by the prospect or they may follow up on the prospect's visit to a tradeshow or any such type event that the client attended and displayed—or any other reason that the client may have for communicating or marketing to a prospect can happen when a call is answered "live" by a prospect. This can happen at any time during the campaign (the 1st call, after voicemail messages have been left on previous calls—again, anytime the prospect answers the phone live). If an agent sets appointments, the provider sends an immediate notification to the client via email, for example. This email notification may include the contact information of the prospect (in the form of a vcf attachment or similar that can be imported into the prospect's CRM program via a simple double-click or a similar method of importing vcf (contact card information) if CRM is non-application based and is web interface) and an ics file or similar which carries the appointment information and this file can also be easily imported into the client's CRM. The agent may work for the provider or for the client directly. In addition to notifying the client via email, System 100 may also notify the client via text/SMS message.

As an alternative to setting an appointment, the client may elect to have the provider notify it that the prospect is at their desk answering their phone when the agent called (i.e., "At Desk Notification"). If the call is answered "live" in this scenario, the agent may end the call quickly and System 100 may send out the notification automatically and that process is driven by the call disposition that the agent chooses at the end of the call. The "At Desk Notification" also includes the vcf or similar file with the prospect's contact information and this notification may be sent by email, text/SMS message or both.

Appointments and "At Desk Notifications" apply when the provider is providing the campaigns as a service, but they may not apply for the (do-it-yourself) subscription model because the caller can set appointments in their own CRM. However, if the client, for example, hired someone to make the calls for them other than the provider, then it may still apply.

System 100 may also have the ability to directly and automatically import into the client's current CRM system. We may offer this direct connection for the most popular CRM systems initially, but may also add additional CRM integration over time. Direct CRM integration will be setup in System 100 settings and will be able to be set during initial preference settings and also will be able to be added at any time through System 100 preferences. As part of this setup, the client would indicate which CRM system they are using (out of the ones System 100 lists) and they would then provide to System 100 their CRM user name and password. Once setup, the client would not have to re-enter their user information and migration of data would be automatic and based on business rules. Once integration to the client's CRM is setup, data such as "responder" contacts and appointments set during calls that are answered live would automatically import. If the client is using a CRM system that System 100 does not currently support when the client starts using System 100—or if the client does not want to integrate the two systems, the client would still be able to import prospect and/or responder data into their own CRM system by making use of the ics and vcf or similar attachments that System 100 can send to the client via email and/text/SMS as attachments.

System 100 includes a server 101 that stores a database 102. The database 102 is in electronic communication with a provider 104 and a client 106. The provider 104 may also be in communication with a call center 108 and an email server 110. The database 102 may include a plurality of telephone numbers as well as email addresses with each telephone number assigned to an electronic device 112, 114, 116, 118 of a prospect. For example, a telephone number may be assigned to electronic device 112, which is associated with Prospect A. The electronic device may be a telephone, smart phone, tablet, or any other electronic device capable of establishing a communication link. In addition, the telephone number refers to any numerical or alphanumeric characters that can be associated with the prospect in order to establish a connection. A first voicemail message may be stored in the database 102 to provide in response to arriving at a voicemail (or answering machine) of the prospect.

Also, a first email message may be stored in the database in order to transmit to an email address associated with the prospect using the email server 110. The database 102 is configured to be updated to indicate whether the first voicemail message was delivered to the voicemail of the prospect and the first email message was transmitted to the email address of the prospect.

Figure 2:
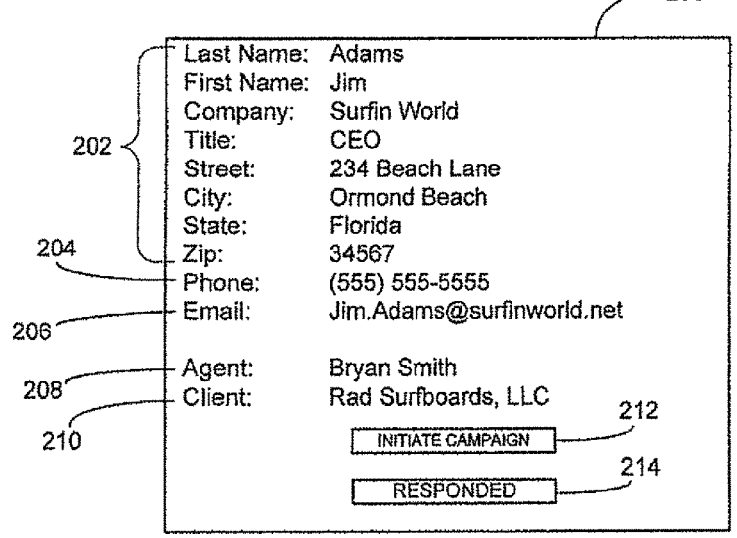
FIG. 2 is exemplary information displayed by a GUI for a particular prospect.

If the first attempt to contact the prospect was unsuccessful, a second connection with the electronic device is established after a pre-determined time subsequent to the first connection, which is configurable by a campaign interval. The delay between message deliveries is the "campaign interval" between messages and it is determined at job set up and can be set to a different value by individual campaign by the client. Accordingly, a second voicemail message stored in the database 102 (or a different external server) may be delivered in response to arriving at the voicemail of the prospect, where the second voicemail message is different than the first voicemail message. If the email feature is selected, then a second email message stored in the database 102 is transmitted to the email address associated with the prospect using the email server 110. The database 102 is further configured to indicate the second voicemail message was delivered to the voicemail of the prospect. The total number of recorded voicemail messages and complementing email messages is set by the client and the total number is not limited by the system, only by the client's and or user's preferences. Referring now to FIG. 2, the telephone marketing and messaging system includes a graphical user interface (GUI) configured to access the database 102 and to visually indicate a status of the marketing campaign. A record 200 for the prospect may include identification information 202 such as last name, first name, company, title, and address. The record 200 may also include a telephone number 204 and email address 206. The agent 208 responsible for the prospect 112 may also be indicated along with the client name 210. The GUI 200 also includes an "initiate campaign" button that can be toggled to begin the campaign. In addition, there may be a "responded" button that can be toggled to indicate the prospect responded and that the campaign is terminated. Also in addition, whether using the subscription model or the service model, the telephone number left on voicemails or answering machines of prospects for them to respond to may be provided by the provider or the client. If the callback telephone number is provided by the provider, then the provider may alert the client via text, SMS or short code or other communication message that they have received a response from a particular prospect— the instant that happens. The text or communication will inform the client that all further voicemails and/or emails have been halted because the prospect responded. This real-time notification serves as "insurance" to the client because it automatically stops the campaign if a response comes through System 100—but does not stop the campaign if the prospect were to call back from a telephone number other than the one in System 100's database. An example of this situation would be that the client's database had the prospect's office number in the database, but the prospects calls back from their cell phone and that number is not in System 100 client database. It is very important to be able to stop campaigns right away since outbound calls can be made for the clients by a third party (either by the provider or someone the client may hire to use the subscription model on their behalf).

Figure 3:
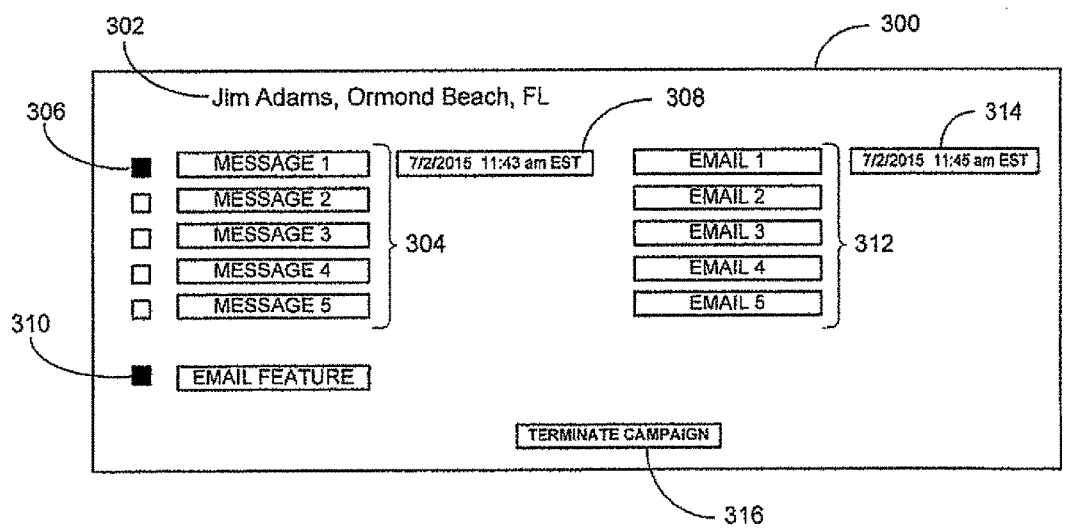
FIG. 3 is a dashboard displayed by the GUI related to a campaign directed to the prospect.

A dashboard 300 can also be accessed by the GUI, which indicates the status of the campaign as shown in FIG. 3. The name of the prospect 302 may be indicated at the top of the dashboard 300, and which voicemail messages that have been delivered to the prospect and when. There may also be a daily email report that is provided that lists all records where "contact" was made the night before. "Contact" identifies that either the agent had a live answer and set an appointment, left a message or provided an "At Desk" notification if that option was select instead of setting an appointment.

For example, status box 306 is toggled indicating that MESSAGE 1 has been delivered to the prospect. The date and time 308 that MESSAGE 1 of the series of voicemail messages 304 was delivered is also displayed. In addition, the dashboard indicates the date and time 314 that EMAIL 1 of the series of emails 312 was delivered to the prospect. The dashboard also indicates that the email feature 310 is currently activated in order to automatically deliver email messages that correlate to the content and sequence of voicemail messages.

A pre-determined schedule configurable by campaign interval is used to determine when to provide the respective email message to the prospect. For example, System 100 may be programmed to provide an email message thirty minutes subsequent to a voicemail message.

The database 102 is configured to store the series of voicemail messages 304 and email messages 312, which is accessible with the GUI. The database 102 and the GUI may be stored remotely on the server 01, stored locally on the server 101, or any combination thereof. The database 102 and the GUI are accessible using an Internet or Intranet in a particular illustrative embodiment.

In addition, the telephone marketing and messaging system may generate a report that includes at least one of, a name of the prospect that was contacted, an identity of each voicemail message that was delivered to the prospect, an identity of each email message that was provided to the prospect, and a link to each of the voicemail and email messages that were provided to the prospect.

The telephone marketing and messaging System 100 may be offered as a service where a provider 104 records the client's voicemail message over the telephone or other audio method to create the series of voicemail messages using their voice. There may be three to eight (or more or less) voicemail messages in a particular series. If the client 106 chooses to also use the email message feature, then the provider 104 may also assist the client 106 in writing a series of email messages that are created to correlate with the various voicemail messages in the series.

The benefit of the series of voicemail messages and, in some cases, email messages, instead of a single voicemail message is that prospects 112, 114, 116, 118 may not respond to a single prospecting voicemail and/or email message. Generally, it may require several attempts to obtain a response and even then, the majority of prospects may not respond. A result of the multiple contacts using the voicemail messages and email messages is an increase in the likelihood that the prospect will respond. This is supported by data that shows that in 2015 that the average number of "cold" contact attempts a salesperson must make to make a contact with a prospect is 8 (up from 3.684 in 2007).

System 100 keeps track of which message has been left to which contact number of the prospect, and automatically serves up the correct message in the series for each number on a list of prospects. System 100 keeps track of which message in the series of messages has been left to which record in the database (each record represents a prospect in the database). Also, in the case of the campaign having multiple profiles (each profile represents an individual representative of the client company, and each one of these profiles has its own sets of messages), records in the database are not assigned to a particular profile until a record it dialed and there is either a live answer where an appointment is set or an "At Desk" Notification is given (depending on what the campaign specifies) or a message is left. Once a record is assigned to a particular profile, the record stays attached to that profile for the entire campaign and therefore, any additional messages will come from the same set of recordings (e.g., the same salesperson) that were created for that particular profile.

In the case where we are providing the service, an agent of the provider would navigate through the phone system of the prospect company to reach the correct person. If the prospect (e.g., Prospect A 112) answers the phone, then the agent may attempt to set an appointment for the client 106 for it to present to the prospect, or the agent may remove him/herself from the conversation expediently and provide an "At Desk" Notification to the client. If an appointment is set, an appointment email is transmitted to the client 106 with an ics or similar attachment, for example, so that the appointment can be placed directly on the client's electronic calendar. The appointment information is also contained in the body of the email in the event the client 106 does not have an electronic calendar. Also, live answers, whether an appointment is set or not, ends the delivery of any further voicemail or email messages for that prospect. All of this would also be true if the client were to hire or assign someone on their own to make the calls on their behalf. The process would also be the same if the client is using System 100 on their own, only in that case they would either be emailing appointment and contact information to themselves—or they would be making use of the CRM integration mentioned earlier to move the prospect appointment or response data into their CRM system.

Referring now to FIG. 3, which shows an exemplary dashboard view on the GUI, if the agent encounters the voicemail of the prospect, the agent can use the GUI to tap click or engage a "Play Message" button at the moment the voicemail "beeps" notification which will instruct System 100 to immediately start playing the appropriate voicemail message (depending on the campaign rules and which if any message has already been left to that particular prospect). Once the message is launched and begins to play, the agent is dropped off of the line and System 100 continues to leave the voicemail message until the voicemail message is complete. System 100 then disconnects from the connection to allow the agent to move on to the next prospect, which System 100 may dial automatically, while the voicemail message is still being delivered by System 100. Because System 100 plays the message to the end without the agent having to stay on the line, for each message left, approximately 30-60 seconds of time are saved (those are the typical duration of voicemail messages of this type—whether delivered live by a person or by System 100—and these average message lengths are for all business voicemail prospecting messages, not just the recorded ones delivered by System 100). By not requiring the agent to stay on a call until the message finishes playing, System 100 increases productivity of the agent.

If the email feature 310 is selected by the client 106, the appropriate email message that correlates with the voicemail message will automatically be sent by System 100 with no input from the agent. The email messages will be transmitted according to a pre-determined schedule, which is configurable by campaign interval. For example, the schedule may be for the email message to be transmitted immediately or an hour or two later depending on how the schedule is determined to be most effective for a particular campaign.

At the end of a day, a report may be generated that can be emailed to the respective client 106. The report may detail a listing of each prospect that was contacted, which voicemail and/or email messages were left, if the prospect answered live and whether or not an appointment was set, for example. In addition, there may be a hyperlink to each of the pre-recorded voicemail messages and email messages in order to easily determine the content of each. This report is also contained in System 100 so the client can also login and see the same information.

Once the client 106 receives a response from a prospect, the client 106 may access System 100 using the Internet where the client 106 can search for the prospect by name or phone number 202, for example. Once the prospect is located, the client 106 may toggle the "responded" button, which in real time will inform System 100 to stop all further voicemail and/or email messages. The possibility of accidentally contacting a prospect with additional voicemail and email messages after the prospect responded is effectively eliminated because the prospect can be identified as "responded" in real time.

Figure 4:
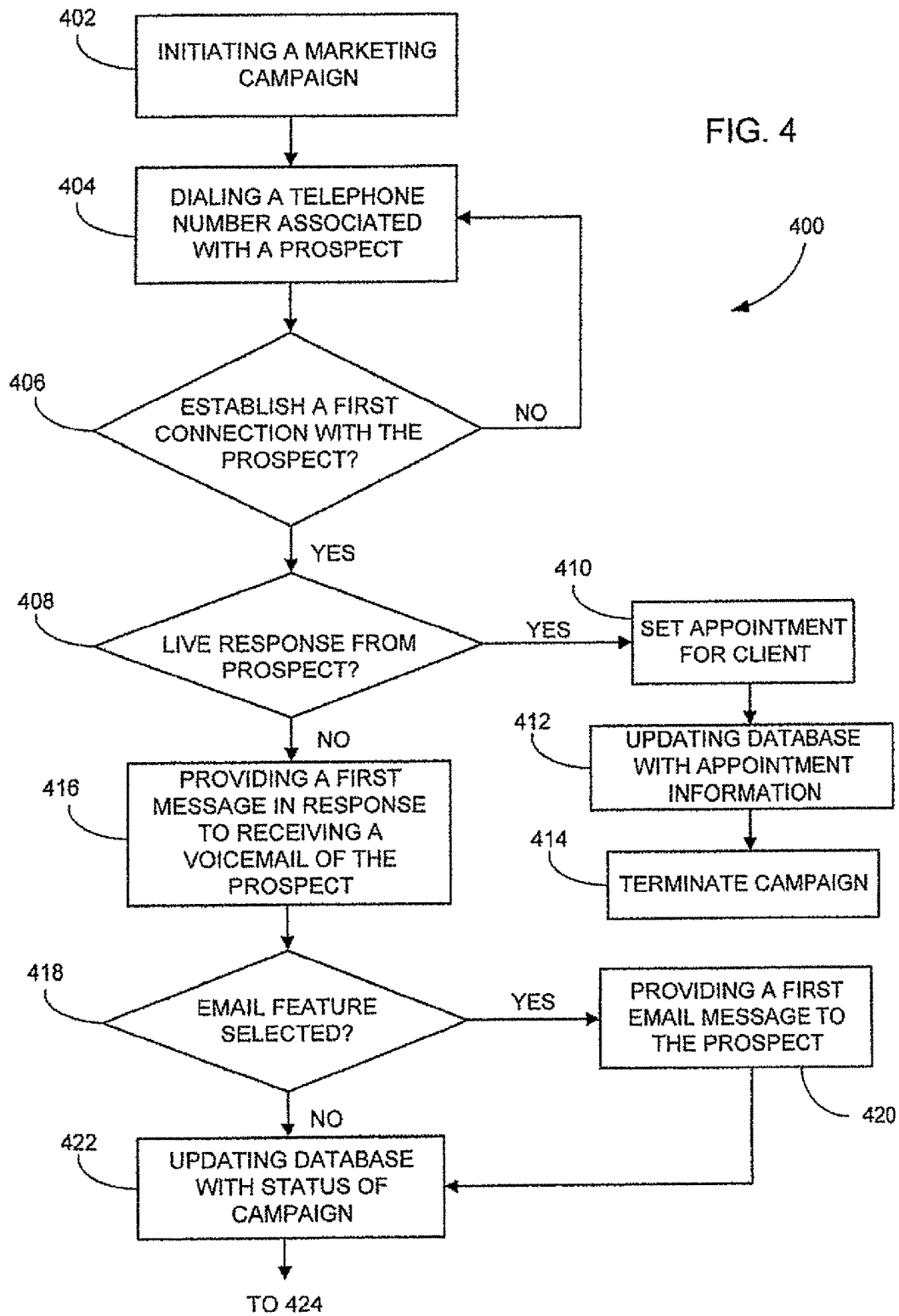
FIG. 4 is a flow diagram of a particular illustrative embodiment of a telephone marketing and messaging method.
Figure 5:
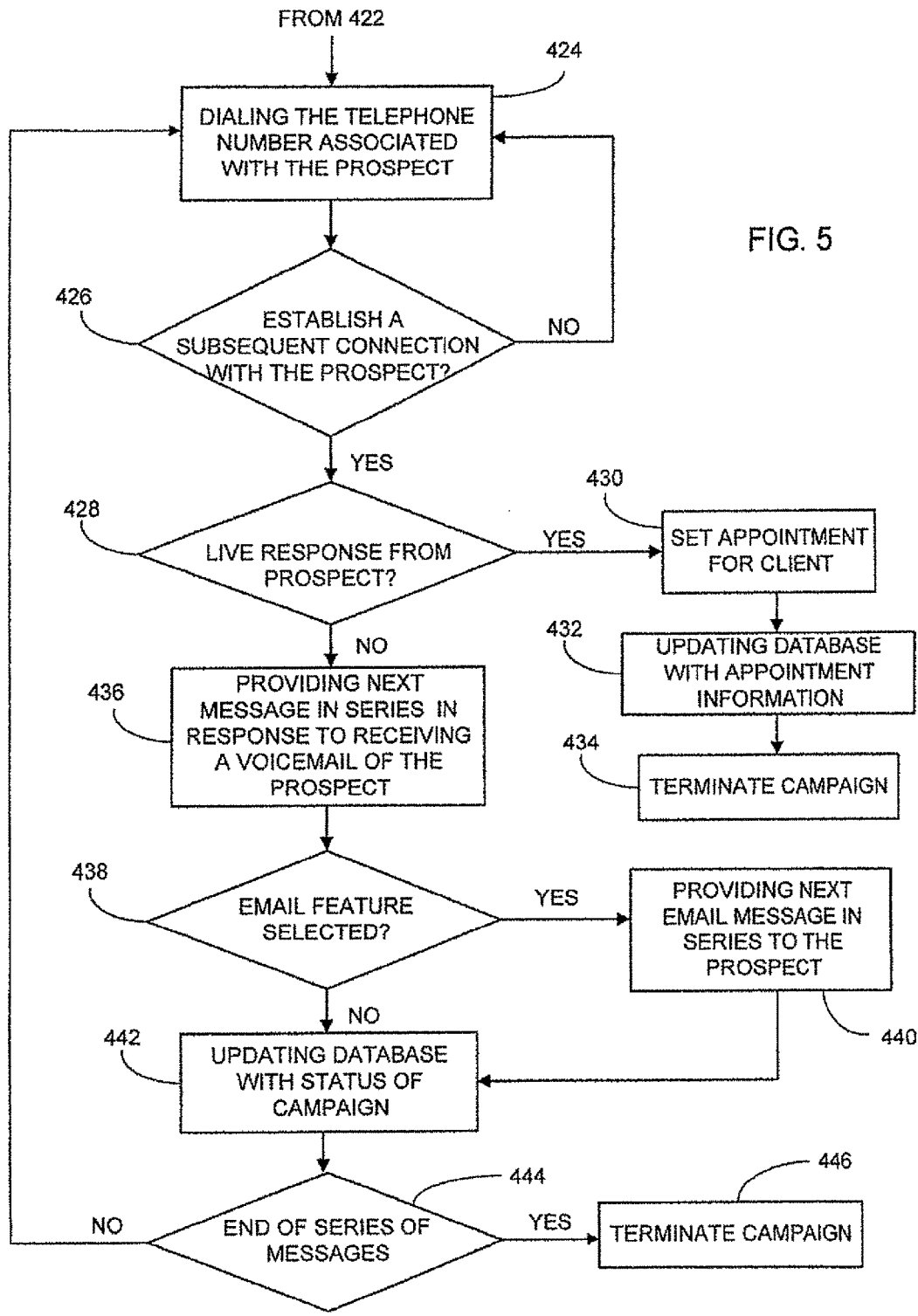
FIG. 5 is a continuation of the flow diagram of the method of FIG. 4 illustrating that the method is conditional and automatic.

Referring now to FIGS. 4 and 5, a flow diagram of the method 400 employing the system described above is illustrated. The method 400 includes initiating a marketing campaign, at 402, and dialing a telephone number associated with a prospect a first time, at 404, where the telephone number is assigned to an electronic device of the prospect. Moving to 406, the method includes attempting to establish a first connection with the electronic device. If no connection was established, the telephone number is dialed again to establish the connection. Once the connection is established, it is determined whether a live response from the prospect was obtained, at 408. If the prospect responded by answering the call, then the agent sets an appointment for the client, at 410. Once the appointment is set, then the database is updated with the appointment information, at 412. The campaign, at 414, is then terminated.

If, at 408, the prospect does not answer the call but voicemail is reached instead, a first message is delivered in response to arriving at the voicemail of the prospect, at 416. Moving to 418, if the email feature is selected, a first email message that correlates to the first voicemail message is delivered to the prospect, at 420. The database is updated, at 422, with the status of the campaign. After a pre-determined time period, which is configurable by campaign interval, the telephone number associated with the prospect may be automatically dialed, at 424, and an attempt to establish a subsequent connection with the prospect is made, at 426. Alternatively, the telephone number may be manually selected and dialed or the agent can "click-to-dial" the number, at 424. If the prospect answers the call this time, at 428, then an appointment is set for the client at 430. The database is updated with the appointment information, at 432, and the campaign is terminated, at 434. If the prospect does not answer the call and voicemail is reached instead, then the next message in the series of messages is delivered, at 436. In addition, the next email message in the series that correlates with the voicemail message is delivered after a client-determined delay, at 440, if the email feature is selected. Moving to 442, the database is updated in real-time as to the status of the campaign, which includes which voicemail and email messages have been left and when. If the voicemail and email messages left this time are the last in the series at 444, then the campaign is terminated at 446. Otherwise, after a pre-determined time period, the telephone number associated with the prospect may be automatically (or manually via an on-screen telephone keypad or by "click-to-dial") dialed again after a pre-determined period of time, at 424, and the process repeats until the prospect responds or reach the end of the series of the voicemail and email messages, for example.

Accordingly, the system and method is designed to deliver a series of voicemail and/or email messages that are automatically selected based upon the timing and results of previously left voicemail and email messages. In addition, the marketing campaign is terminated by selecting a single button on the GUI (either the provider GUI and/or the client facing GUI) showing a response or a live answer. Responders are marked and indicated by the end-user/client. This is an extremely important feature because without the ability to easily and quickly stop message delivery to prospects who have already responded, the end result would be a marketing "fail" because prospects would then realize that all previous calls were recorded. Or, worse, the client would appear to be disorganized and not a good manager of their own data and prospecting/contacting techniques. In addition to the client being able to easily mark off responders, System 100 may also have the ability to "auto-stop" further messaging. This would be an option and it would work in the following way: The client would forward their phone number to a local phone number System 100 would provide. Once this was done, all inbound calls to that number would run through System 100. System 100 would recognize the number if it is in the database of numbers that the client called and if so, System 100 would automatically mark the prospect's record as "responded"—which would stop all further calls and emails to that prospect—and System 100 would also in that case change the caller ID to a code (such as 007 as an example) that the client would recognize as meaning that the call coming in is from a prospect who is responding. Subsequent calls from the same number who just display the regular caller ID information (as would calls from any number not in the outbound calling and emailing database). The auto-stop feature will only work if the prospect responds by phone from the same number that the client used System 100 to dial (or from an additional number that is part of that prospect's record that is also in the database and associated with the client's campaign). So for example, if the prospect was called by System 100 at their office phone number, but they respond to a message or email delivered by the client from a different phone, e.g. their cell phone, then System 100 would not recognize the number and therefore would not mark the record as "responded". It is for this reason that the auto-stop serves as "insurance" in case the client forgets to mark the record as responded. In other words, System 100 will instruct clients to always mark as responded manually—even if they have auto-stop "insurance". Auto-stop will most likely save the client from the embarrassment of messages being delivered to a prospect after they respond if the client forgets to mark as responded manually because most times the prospect will respond from the number where the client delivered the messages. Even if the prospect is responding to the email by phone instead of the voicemail message, the same will also be true. Live answers may be indicated and marked by the agent or the client (or client designee) if using the do-it-yourself subscription model. Yet another advantage of the system and method is that only one button is required to be selected in order to send both a voicemail and an email. Furthermore, the system and method automatically selects the correct voicemail and email messages to send in the series because it automatically tracks which messages were previously left. Thus, the agents can be more efficient and thereby allowing them to make more potential contacts with the prospects on the list.

The system and method can be a service offered by a provider as described above, or in another embodiment, the system and method is a subscription model service that the agent can access by logging on to a website hosted by the provider. In the subscription model, the agent will be able to upload their own prospect list and/or be able to search for and create a business list of targeted prospects through the GUI. The list supplier will be a nationally recognized list supplier and the GUI will allow the agent to search for a list using all available selects and/or selects that we choose to expose to the agent from the list provider. "Selects" are list attributes. The subscription service does not require a telephone, only a USB headset. The telephone calls are dialed through the provider either automatically, by clicking on a link or by using an on-screen softphone telephone keypad (or similar on-screen or hardware device). Once a call is connected to the number being dialed, the agent can use the on-screen telephone keypad (or similar on-screen or hardware device) to navigate through a business phone system. The agent records their own voicemail messages using a microphone or USB headset directly through the web interface. The agents create their own email messages and the provider will send the emails out under the respective agent's email address and the emails are delivered one at a time rather than in bulk. There are an unlimited number of messages that can be recorded for a marketing campaign. The subscription service is stand-alone and no other tools are needed.

The system may be set to automatically dial phone numbers, to dial on-demand via clicking a link to dial. In addition, numbers can be dialed manually via an on-screen telephone keypad (softphone) or via a hardware keypad device connected to the user's computer. System 100 can even be configured to establish a connection to the user's phone and that device can also be used for dialing. Automatic mode dials the next prospect in the list of prospects once the previous prospect on the list has had its disposition selected by the agent. Regardless of the mode, the agent does not have to keep track of which message was left last—nor do they have to select which message to play. Indeed, System 100 keeps track of that information and System 100 will indicate on a current record 200 being displayed on the GUI, which message, if any, was previously left. In addition, the agent has the ability to terminate the campaign and stop the messages once a response is received from the prospect.

In another embodiment, the system and method may be included as a plug-in to existing customer relationship management (CRM) system.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. For example, System 100 may be used for debt collection activities or fund raising, and not just for lead generation as in the embodiments described above.

That which is claimed is:

1. A telephone marketing and messaging method, the method comprising:
    initiating a marketing campaign;
    dialing a telephone number associated with a prospect a first time, wherein the telephone number is assigned to an electronic device of the prospect;
    establishing a first connection with the electronic device;
    providing a first voicemail message in response to arriving at a voice mail of the prospect;
    transmitting a first email message to an email address associated with the prospect;
    updating the database to indicate whether the first voicemail message was delivered to the voicemail of the prospect and the first email message was transmitted to the email address of the prospect;
    dialing the telephone number of the prospect a second time;
    establishing a second connection with the prospect;
    providing a second voicemail message in response to arriving at the voicemail of the prospect, wherein the second voicemail message is different than the first voicemail message;
    transmitting a second email message to an email address associated with the prospect;
    updating the database to indicate the second voicemail message was delivered to the voicemail of the prospect; and
    terminating the marketing campaign when the prospect responds.

2. The telephone marketing and messaging method of claim 1, the method comprising:
    initiating a marketing campaign;
    dialing a telephone number associated with a prospect to establish a connection;
    providing one of a plurality of pre-recorded voicemail messages to the prospect each time in response to arriving at a voicemail of the prospect, wherein each voicemail message of the plurality of messages is different from one another; and
    continuing to provide voicemail messeages to the prospect each time in response to arriving at a voicemail of the prospect until the prospect responds or the marketing campaign is terminated.

3. The telephone marketing and messaging method of claim 2, further comprising:
    updating a database each time a respective voicemail message is delivered to the prospect; and
    displaying a status of the marketing campaign, wherein the status includes at least a number of voicemail messages that have been delivered to the prospect.

4. The telephone marketing and messaging method of claim 3, further comprising transmitting one of a plurality of email messages, wherein a respective email message correlates with a content of a respective voicemail message delivered to the prospect.

5. The telephone marketing and messaging method of claim 4, further comprising providing the respective email message to the prospect in accordance with a pre-determined schedule.

6. The telephone marketing and messaging method of claim 5, further comprising communicating with the prospect to set an appointment with the prospect for a teleconference with a representative.

7. The telephone marketing and messaging method of claim 6, further comprising storing the plurality of voicemail messages and email messages in a database that is accessible with a graphical user interface (GUI).

8. The telephone marketing and messaging method of claim 7, further comprising:
generating a report that includes at least one of, a name of the prospect that was contacted, an identity of each voicemail message that was delivered to the prospect, an identity of each email message that was provided to the prospect, and a link to each of the voicemail and email messages that were provided to the prospect; and
transmitting the report to the representative.

9. The telephone marketing and messaging method of claim 8, wherein the database and GUI is stored remotely on a server.

10. The telephone marketing and messaging method of claim 8, wherein the database and GUI is stored locally on a server.

11. A telephone marketing and messaging system for a marketing campaign, the system comprising:
a server;
a database stored on the server;
a plurality of telephone numbers in the database, each telephone number assigned to an electronic device of a prospect;
a first connection between with the server and the electronic device;
a first voicemail message stored in the database to provide in response to arriving at a voicemail of the prospect;
a first email message stored in the database and to transmit to an email address associated with the prospect;
wherein the database is configured to be updated to indicate whether the first voicemail message was delivered to the voicemail of the prospect and the first email message was transmitted to the email address of the prospect;
a second connection between the server and the electronic device established a pre-determined time subsequent to the first connection;
a second voicemail message stored in the database to provide in response to arriving at the voicemail of the prospect, wherein the second voicemail message is different than the first voicemail message; and
a second email message stored in the database to transmit to the email address associated with the prospect;
wherein the database is further configured to indicate the second voicemail message was delivered to the voicemail of the prospect.

12. The telephone marketing and messaging system of claim 11, further comprising a graphical user interface (GUI) configured to access the database and to visually indicate a status of the marketing campaign, wherein the status includes at least a number of voicemail messages that have been delivered to the prospect.

13. The telephone marketing and messaging system of claim 12, wherein a respective email message correlates with a content of a respective voicemail message delivered to the prospect.

14. The telephone marketing and messaging system of claim 13, further comprising a pre-determined schedule to determine when to provide the respective email message to the prospect.

15. The telephone marketing and messaging system of claim 14, further comprising communicating with the prospect to set an appointment with the prospect for a teleconference and/or meeting with a representative.

16. The telephone marketing and messaging system of claim 15, wherein the database is configured to store the plurality of voicemail messages and email messages in the database that is accessible with the GUI.

17. The telephone marketing and messaging system of claim 16, further comprising a report that includes at least one of, a name of the prospect that was contacted, an identity of each voicemail message that was delivered to the prospect, an identity of each email message that was provided to the prospect, and a link to each of the voicemail and email messages that were provided to the prospect.

18. The telephone marketing and messaging system of claim 17, wherein the database and the GUI are stored remotely on the server.

19. The telephone marketing and messaging system of claim 17, wherein the database and the GUI are stored locally on the server.

20. The telephone marketing and messaging system of claim 17, wherein the database and the GUI are accessible using an Internet or Intranet.

* * * * *